(12) United States Patent
Lin et al.

(10) Patent No.: US 9,035,751 B2
(45) Date of Patent: May 19, 2015

(54) COMMUNICATION POWER LINE STATUS DETECTING METHOD AND SYSTEM USING THE METHOD

(75) Inventors: Ken-Huang Lin, Kaohsiung (TW); Jheng-Ruel Li, Tainan (TW); Hsuan-Chang Lee, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 479 days.

(21) Appl. No.: 13/451,150

(22) Filed: Apr. 19, 2012

(65) Prior Publication Data

US 2013/0201009 A1  Aug. 8, 2013

(30) Foreign Application Priority Data

Feb. 3, 2012 (TW) .............................. 101103479 A

(51) Int. Cl.
*G08C 19/12* (2006.01)
*H04B 3/54* (2006.01)
(52) U.S. Cl.
CPC *G08C 19/12* (2013.01); *H04B 3/54* (2013.01); *H04B 2203/5495* (2013.01)
(58) Field of Classification Search
CPC ...... G08C 19/12; H04B 3/54; H04B 10/0791; H04B 2203/5495
USPC .......................... 340/13.23, 538.11, 649–652; 324/532–535
See application file for complete search history.

(56) References Cited

U.S. PATENT DOCUMENTS

| 6,917,888 | B2 | 7/2005 | Logvinov et al. | |
|---|---|---|---|---|
| 2004/0036478 | A1* | 2/2004 | Logvinov et al. | 324/534 |
| 2006/0165117 | A1* | 7/2006 | Iwamura | 370/464 |
| 2011/0110408 | A1 | 5/2011 | Schwager et al. | |

FOREIGN PATENT DOCUMENTS

| EP | 2057727 | 5/2009 |
|---|---|---|
| EP | 2 312 764 A1 | 4/2011 |
| TW | M309105 | 4/2007 |
| WO | WO 2008/028144 A2 | 3/2008 |

* cited by examiner

*Primary Examiner* — Edwin Holloway, III
(74) *Attorney, Agent, or Firm* — Birch, Stewart, Kolasch & Birch, LLP

(57) ABSTRACT

A communication power line status detecting method and a system using the method provided by the present disclosure is suitable for used in a transmission device and a receiving device which are connected by a communication power line. The transmission device transmits a communication indicator signal through the communication power line. When the receiving device receives the communication indicator signal from the communication power line, it converts the communication indicator signal into a time domain in order to analyze the signal reflection and transmission status of the communication indicator signal when it is transmitted via the communication power line, and to generate a line status information corresponding to the communication power line.

14 Claims, 5 Drawing Sheets

COMMUNICATION POWER LINE STATUS DETECTING METHOD AND SYSTEM USING THE METHOD

CROSS-REFERENCE TO RELATED APPLICATION

This application claims the benefit of Taiwan Patent Application No. 101103479, filed on Feb. 3, 2012, which is hereby incorporated by reference for all purposes as if fully set forth herein.

BACKGROUND

1. Field of Disclosure

The present disclosure relates to a communication power line status detecting method and more particularly to a communication power line status detecting method which determines a line status based on the changes of channel characteristics of the communication power line.

2. Related Art

Please refer to FIG. 1, which is an illustration of a framework of a conventional detecting system for a communication power line 20. The system comprises a detecting device 10 and a communication power line 20. The detecting device 10 comprises a signal generating circuit 11, a signal receiving circuit 12, a signal analysis circuit 13 and an oscilloscope 14. The signal generating circuit 11 generates a test signal which is transmitted to the communication power line 20. Signal reflection and transmission occur when the communication power line 20 is abnormal. Once reflected signals are received by the signal receiving circuit 12, the reflected signals are converted into a time domain by the signal analysis circuit 13 and the reflected signals are analyzed by time domain reflectometry (TDR). Thereby, the channel characteristics of the communication power line 20 are analyzed in order to determine the degradation, damage or the exposed positions of metal lines of the communication power line 20.

SUMMARY

The present disclosure provides a communication power line status detecting method which comprises steps of: transmitting a communication indicator signal by a transmission device through a communication power line; obtaining the communication indicator signal by a receiving device from the communication power line; converting the communication indicator signal into a time domain by the receiving device; and analyzing a signal reflection and transmission status of the communication indicator signal transmitted via the communication power line by using a time domain transmission analyzing method by the receiving device and generating a line status information corresponding to the communication power line.

The present disclosure provides a communication power line status detecting system which comprises a transmission device and a receiving device. The transmission device comprises a signal transmission module. The receiving device comprises a signal receiving module and a signal analyzing module.

The signal transmission module transmits a communication indicator signal in a communication power line. The signal receiving module obtains the communication indicator signal via the communication power line. The signal analyzing module converts the communication indicator signal into a time domain in order to analyze a signal reflection and transmission status of the communication indicator signal transmitted in the communication power line by using a time domain transmission analyzing method and to generate a line status information.

DETAILED DESCRIPTION OF THE DISCLOSURE

The present disclosure will become more fully understood by reference to the following detailed description thereof when read in conjunction with the attached drawings.

Figure 2:
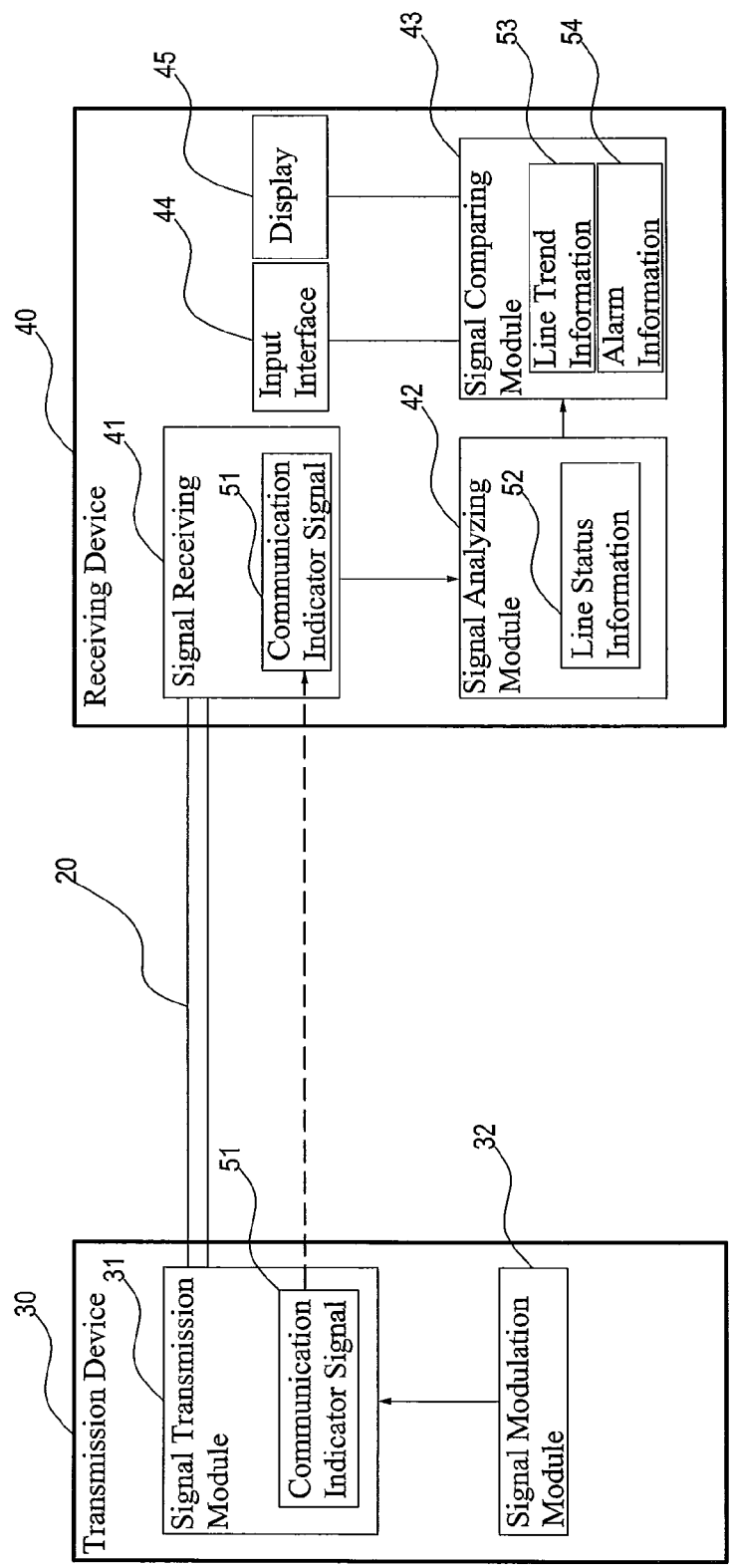
FIG. 2 is an illustration of a framework of a communication power line status detecting system according to an embodiment of the present disclosure.
Figure 3:
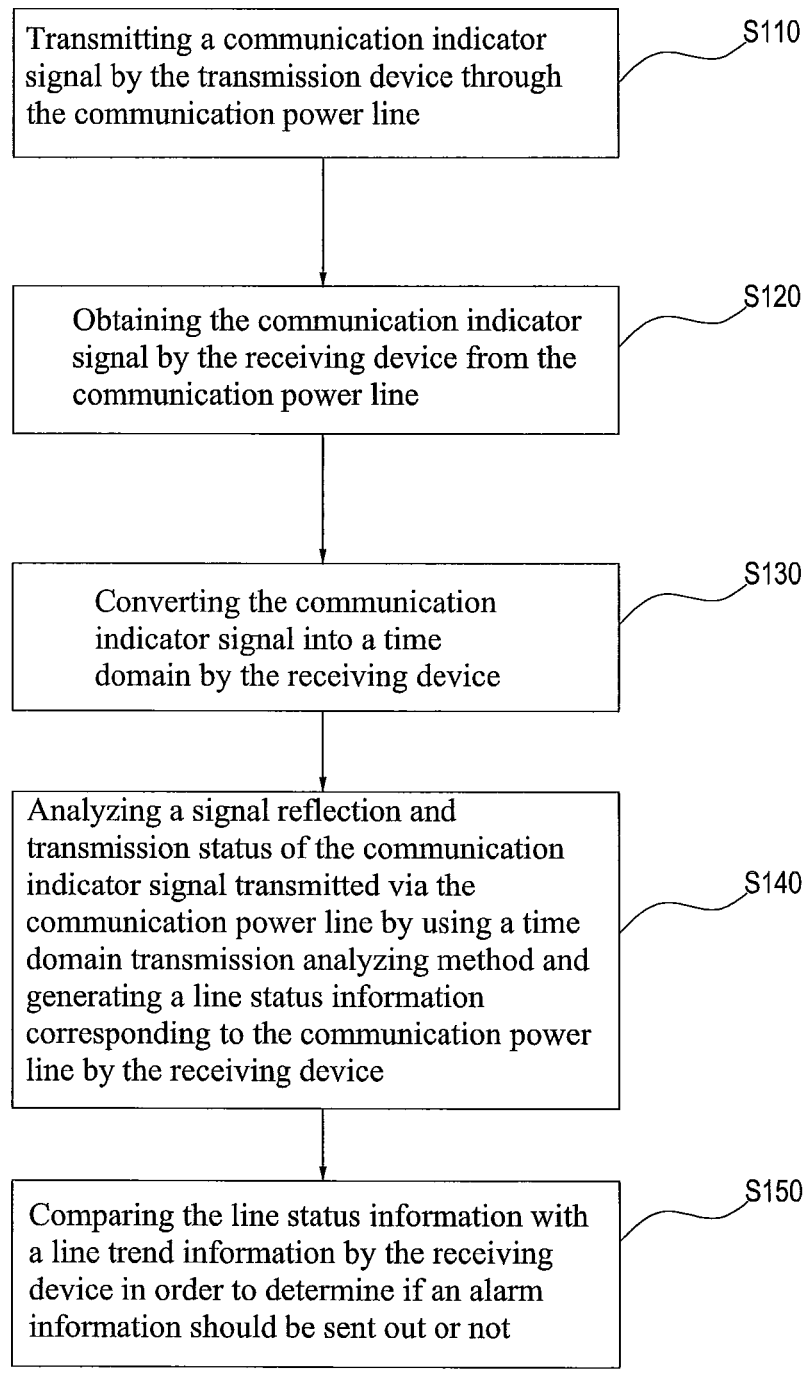
FIG. 3 is a flowchart of a communication power line status detecting method according to an embodiment of the present disclosure.

FIG. 2 is an illustration of a framework of a communication power line status detecting system according to an embodiment of the present disclosure. The communication power line status detecting system comprises a transmission device 30 and a receiving device 40. The transmission device 30 comprises a signal transmission module 31. The receiving device 40 comprises a signal receiving module 41 and a signal analyzing module 42. A communication power line 20 is connected between the transmission device 30 and the receiving device 40 for communication. Please also refer to FIG. 3 for the following descriptions. FIG. 3 is a flowchart of a status detecting method for the communication power line 20 according to an embodiment of the present disclosure. The status detecting method comprises steps of:

Step 110: Transmitting a communication indicator signal 51 by the transmission device 30 through the communication power line 20. The signal transmission module 31 is used for transmitting the communication indicator signal 51. The transmission device 30 further comprises a signal modulation module 32 for modulating the communication indicator signal 51 and transmitting the modulated communication indicator signal 51 to the communication power line 20. Even if the communication power line 20 is made of a material with characteristics of high attenuation and high noise, the effects of signal attenuation and distortion on the communication can still be reduced substantially. The signal modulation technique used by the signal modulation module 32 to modulate the communication indicator signal 51 is orthogonal frequency division multiplexing (OFDM). But it is not limited to OFDM, other signal modulation techniques can also be used.

Step 120: Obtaining the communication indicator signal 51 by the receiving device 40 from the communication power line 20. The communication indicator signal 51 is transmitted to the receiving device 40 by the communication power line 20 and is received by the signal receiving module 41. When the communication indicator signal 51 is transmitted via the communication power line 20, changes will occur to the signal because of the characteristics of the communication power line 20 and interference of external noise. Therefore, the signal changes of the communication indicator signal 51 transmitted in the communication power line 20 can be indicated as:

$$r(t)=s(t)*h(t)+n(t) \quad \text{Formula (1):}$$

Wherein, s(t) is the signal pattern of the communication indicator signal 51 transmitted by the signal transmission module 31. h(t) is the system pulse response of the communication power line 20. n(t) is the noise integrated with the communication indicator signal 51 transmitted in the communication power line 20. r(t) is the signal pattern of the communication indicator signal 51 when it is received by the receiving device 40. Wherein, s(t) and r(t) are already known, n(t) can be detected by the detecting device 10, or by a detecting element disposed in the transmission device 30 or the receiving device 40; or can be set hypothetically by the user based on requirements. However, the method for detecting noise is not limited to, any noise techniques which can detect communication are also applicable. h(t) can be calculated from the formula (1).

Step 130: Converting the communication indicator signal 51 into a time domain by the receiving device 40.

Step 140: Analyzing a signal reflection and transmission status of the communication indicator signal 51 transmitted via the communication power line 20 by using a time domain transmission analyzing method and generating line status information 52 corresponding to the communication power line 20 by the receiving device 40.

The signal analyzing module 42 converts the communication indicator signal 51 into a time domain in order to analyze the signal reflection and transmission status of the communication indicator signal 51 transmitted via the communication power line 20 by using the time domain transmission analyzing method and to generate the line status information 52.

Furthermore, the signal pattern s(t) transmitted by the signal transmission module 31 comprises a step function signal u(t). The signal analyzing module 42 uses the time domain transmission analyzing method to analyze the signal pattern r(t) of the communication indicator signal 51 received by the receiving device 40 in order to generate the line status information 52. The line status information 52 (TDT) can be indicated as TDT=u(t)*h(t). The line status information 52 comprises the generation time of an abnormal transmitted signal or an abnormal reflected signal generated when the communication indicator signal 51 is transmitted in the communication power line 20. The signal analyzing module 42 calculates the position of the abnormal transmitted signal or the abnormal reflected signal generated in the communication power line 20 based on the generation time.

The signal pattern s(t) of the communication indicator signal 51 transmitted by the transmission device 30 can be pre-stored in the receiving device 40. The storing method is based on the data storage technique commonly used nowadays which will not be mentioned herein. Therefore, when the signal analyzing module 42 receives the communication indicator signal 51, the matching degree of the communication power line 20, the impedance changes in the communication power line 20 and the frequency response of branch and noise in the frequency domain are reflected through the signal changes of the communication indicator signal 51 before it is transmitted and after it is received.

The receiving device 40 performs demodulation using orthogonal frequency division multiplexing (OFDM). The kth subcarrier received signal R(n,k) of the nth OFDM symbol in the communication indicator signal 51 is indicated as:

$$R(n,k)=\Im[r(t)]=H(n,k)S(n,k)+N(n,k) \quad \text{Formula (2):}$$

Wherein, H(n,k), S(n,k) and N(n,k) are Fourier transforms of s(t), h(t) and n(t) respectively. Because S(n,k) is a known indicative symbol, H(n,k) plus a noise can be obtained by dividng R(n,k) by S(n,k). Because wire transmission is performed by the communication power line 20, the noise is much smaller than the signal which can be omitted in the calculation. The system pulse response h(t) can be obtained by inverse Fourier transform after dividing R(n,k) by S(n,k). Then, the line status information 52 can be obtained by multiplying h(t) by the step function u(t), i.e. h(t)*u(t).

Step 150: Comparing the line status information 52 with a line trend information 53 by the receiving device 40 in order to determine if an alarm information 54 should be sent out or not. The receiving device 40 further comprises a signal comparing module 43. The signal comparing module 43 is used for comparing the line status information 52 (TDT) with the line trend information 53 in order to determine the status of the communication power line 20 and to decide if the alarm information 54 should be sent out or not. The information comparing method is based on the requirements of the designer. Any methods are applicable which can analyze and determine if the communication power line 20 is degraded.

There are at least two types of the line trend information 53. One of the types is a standard parameter of safety communication of the communication power line 20. Through an information inputting menu shown on a display 45 of the receiving device 40, the standard parameter of communication line safety can be input and adjusted via an input interface 44 of the receiving device 40. The input interface 44 can be an input unit such as a mouse, keyboard or any control unit. Another type is the previous line status information 52 recorded by the receiving device 40 when the communication indicator signal 51 is transmitted in the communication power line 20.

A practical experiment is described hereinafter for an example. The household communication power line 20 with the specification of 1.6MMX2C is used as an example. The conductor interval D is 3.2 mm, the conductor radius r is 0.8 mm and the length of the power line is 1 meter. The communication power line 20 is a 2-terminal physical transmission line. In this example, the insulation layer in the middle of the communication power line 20 is peeled off and a bare wire of approximately 0.6 cm is formed.

Figure 4:
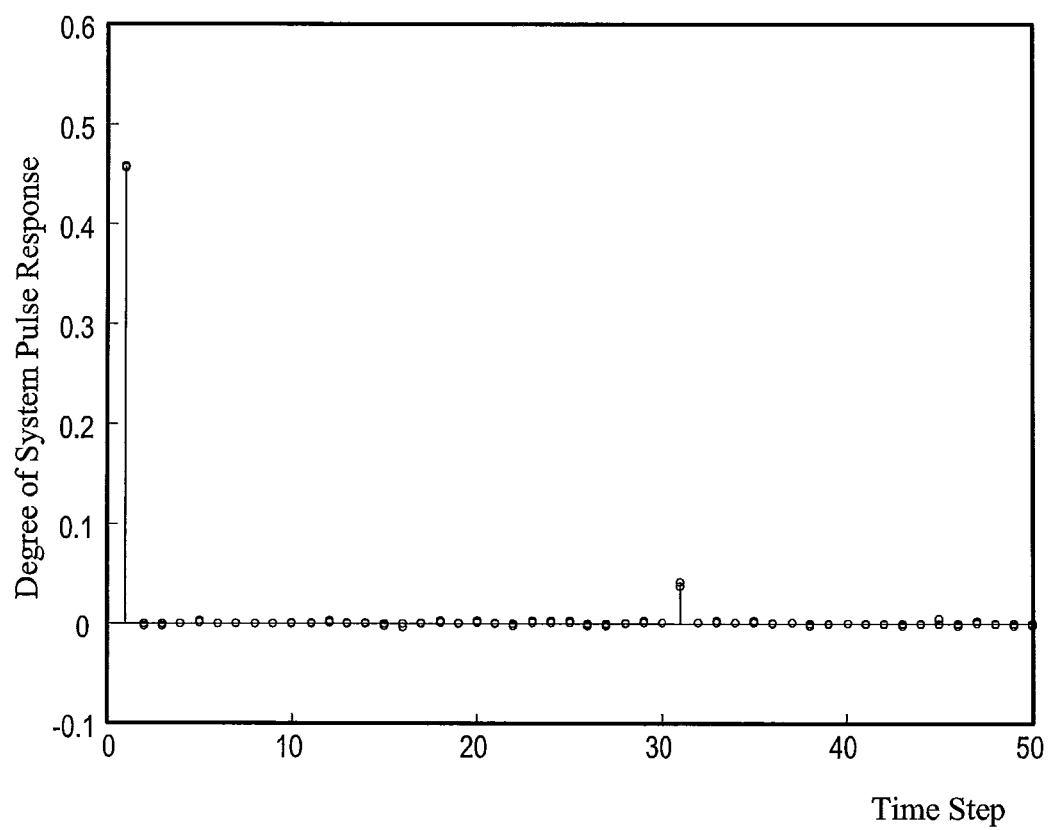
FIG. 4 is a graph of line status information according to an embodiment of the present disclosure.

Please refer to the system framework shown in FIG. 2. The communication indicator signal 51 can be provided for the transmission device 30 by other devices, or is generated by the signal transmission module 31. The communication indicator signal 51 is then transmitted to the communication power line 20 after being modulated by the signal modulation module 32 (e.g. using orthogonal frequency division multiplexing). Assume that the signal pattern of the communication indicator signal 51 transmitted by the transmission device 30 is s(t). Changes will occur to the communication indicator signal 51 due to the effects of the system pulse response h(t) and external noise n(t) when the communication indicator signal 51 is transmitted in the communication power line 20. The signal pattern of the communication indicator signal 51 is changed into r(t)=s(t)*h(t)+n(t) when the signal is received by the signal receiving module 41. The signal analyzing module 42 analyzes r(t) by using the pre-known signal pattern s(t) of the communication indicator signal 51 and time domain transmission analyzing method. r(t) is indicated as:

$$r(t) = \frac{s(t)}{2} \cdot \frac{2Z_c}{Z_c + Z_0} \cdot \frac{2Z_0}{Z_0 + Z_c} \quad \text{Formula (3)}$$

$$\rightarrow Z_c = \frac{Z_0\left(s(t) - r(t) + \sqrt{s(t)(s(t) - 2r(t))}\right)}{r(t)}$$

Wherein $z_o$ is the system impedance. The matching degree of the communication power line 20 and the impedance changes in the communication power line 20 can be obtained from the above formula. The step function signal u(t) of the signal pattern s(t) can also be obtained. The line status information 52 illustrated in FIG. 4 is known by using the system pulse response h(t) and is shown on the display 45 of the receiving device 40. The line status information 52 is the value changes of the system pulse response h(t) corresponding to each time step unit.

In this example, abnormal changes occur in the system pulse response h(t) corresponding to the 31st time step unit as shown in FIG. 4. From FIG. 4, we also know that abnormal transmission signal is generated when the communication indicator signal 51 is at the 31st time step unit and the communication indicator signal 51 has passed the degraded part of the communication power line 20. The time step units are converted into distances and the conversion is indicated in formula (4). The degraded position of the communication power line 20 can be calculated by formula (4).

$$\Delta t = \frac{\Delta x}{v_p} = \frac{\Delta x \sqrt{\varepsilon_r}}{c} \quad \text{Formula (4)}$$

Figure 1:
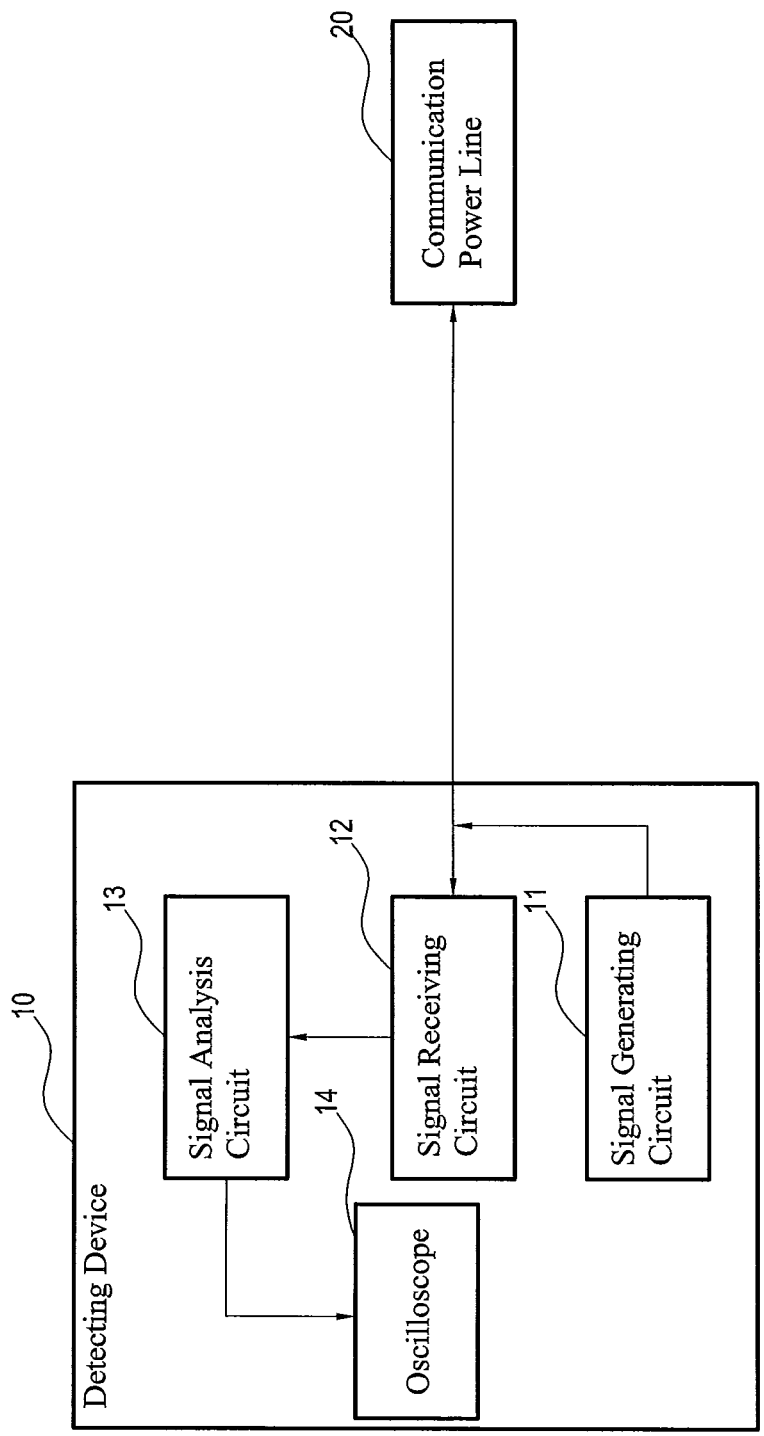
FIG. 1 is an illustration of a framework of a conventional communication power line detecting system.

Comparing with the conventional time domain transmission analyzing method which is applying the communication power line 20 in the system framework shown in FIG. 1, we assume the characteristic impedance Z, the length L, the dielectric constant K, the conductor attenuation A, the reference frequency F and the loss tangent Tan D of the communication power line 20. Wherein the characteristic impedance Z can be indicated as:

$$Z_c \cong \sqrt{\frac{L'}{C'}} = \frac{120}{\sqrt{\varepsilon_r}} \cosh^{-1} \frac{D}{2r} \quad \text{Formula (5)}$$

Signal has different transmission speed due to different mediums. The relationship between the signal transmission speed and transmission time can be indicated as:

$$\Delta t = \frac{2\square x}{V_p} = \frac{2\square x \sqrt{\varepsilon_r}}{c} \quad \text{Formula (6)}$$

Figure 5:
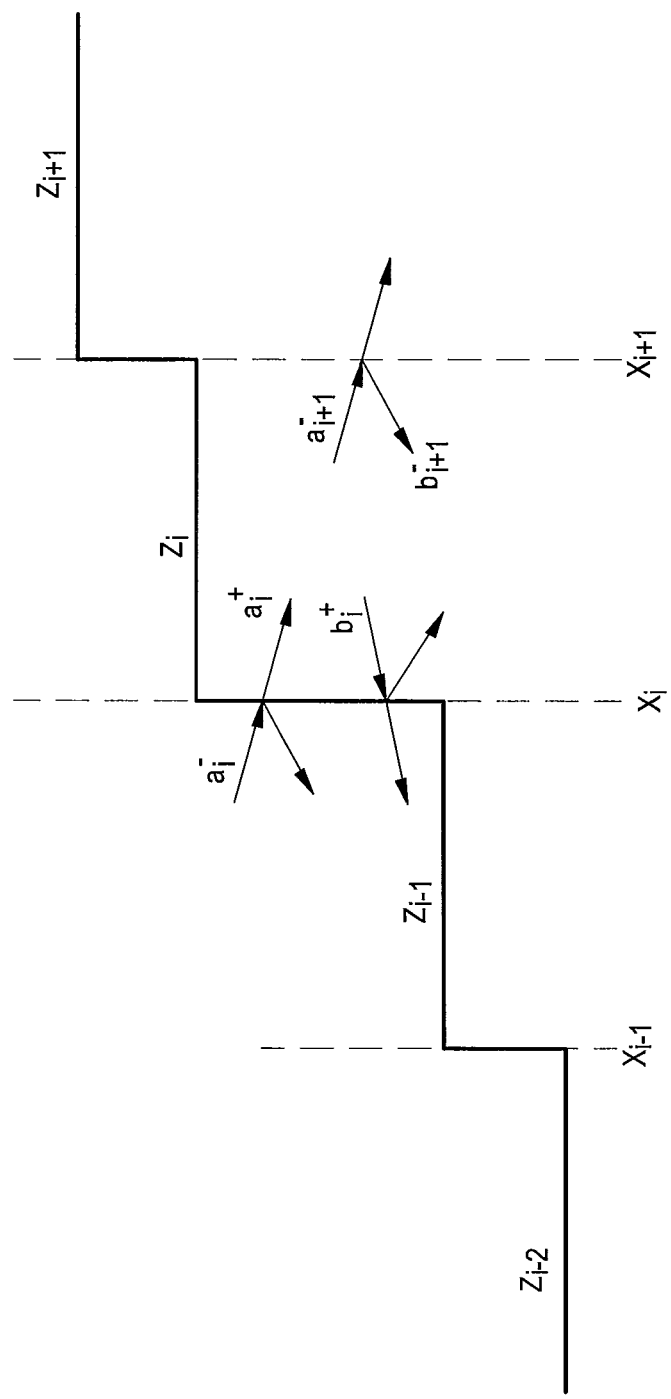
FIG. 5 is an illustration of impedance changes encountered by electromagnetic waves during transmitting in the communication power line.

FIG. 5 is an illustration of impedance changes encountered by electromagnetic waves during transmitting in the communication power line 20. According to microwave engineering, when impedance changes are encountered by electromagnetic waves during transmitting in the communication power line 20, reflection and transmission are occurred in the signals. The relative value between the reflected waves and incident waves is reflection coefficient, and the relative value between the transmitted waves and incident waves is insertion coefficient. The reflection coefficient and the insertion coefficient are respectively:

$$\rho_i = \frac{Z_i - Z_{i-1}}{Z_i + Z_{i-1}} \quad \text{Formula (7)}$$

$$\tau_i = \frac{2Z_i}{Z_i + Z_{i-1}} \quad \text{Formula (8)}$$

If the impedance in the communication power line 20 remains the same without any changes, the reflection coefficient is 0 and there will be no reflection occur in the transmitting of signals. The signals will be transmitted continuously. If the impedance increases, the reflection coefficient is larger than 0 which means normal reflection occurs. If the reflection coefficient is smaller than 0 which means reverse reflection occurs. The reflection will be sent to the detecting device 10. The voltage and corresponding impedance of the reflected signals received by the signal receiving circuit 12 can be calculated by respectively:

$$V_{tdr} = \frac{V_s}{2}(1+\rho) \quad \text{Formula (9)}$$

$$Z_c = \frac{Z_0 V_{tdr}}{V_s - V_{tdr}} \quad \text{Formula (10)}$$

Wherein, $V_S$ is the amplitude of the inputted step function signal u(t), $V_{tdr}$ is the voltage of the reflected signals corresponding to the time response, $Z_0$ is the system impedance and assume that it is 50Ω.

From formula (5), it is known that the characteristic impedance and the square root of the dielectric constant of the communication power line 20 are in inverse proportion to each other, and therefore the dielectric constant is an important variable factor which can affect the impedance of the communication power line 20. When the insulation layer of the communication power line 20 is peeled off after a long period of degradation, the medium is changed from the insulation layer into air on the peeled off position and the dielectric constant will decrease to cause the impedance to increase.

In this example, the insulation layer in the middle of the communication power line 20 is also peeled off and a bare wire of approximately 0.6 cm is formed. From formula (5), it is known that the dielectric constant of the bare wire will decrease and the impedance of the bare wire of the communication power line 20 will increase. Assume that the overall average impedance of the communication power line 20 is 90Ω. From formulas (5) and (6), it is known that when signals pass the bare wire and reflected signals are generated, the measured time of the reflected signals received by the signal receiving circuit 12 is approximately 3.8 ns and the impedance of the communication power line 20 will be increased from 90Ω to 158Ω. Virtually, after the measurement by using an avometer, an oscilloscope or other methods which can calculate the impedance value of the bare wire, the impedance of the bare wire is approximately 111.1Ω. Even though it has not reached 158Ω, the extent of changes on the signals can still be presented. The measured time of the reflected signals received by the signal receiving circuit 12 is also approximately 3.8 ns which is in line with the above theory.

However, if the measurement result is converted into the time domain transmission (TDT) analyzing result, i.e. TDT=u(t)*h(t), the result presented will be the same as shown in FIG. 4. Abnormal changes occur in the system pulse response h(t) corresponding to the 31st time step unit. Thereby, it is known that the measurement result of the communication power line 20 by using the system framework in FIG. 2 is the same as the measurement result of the communication power line 20 by using the conventional time domain reflectometry (TDR).

In the system framework provided by the present disclosure, the transmission device 30 and the receiving device 40 can be network equipment such as router, hub, access point equipment, server or personal computer which performs network communication and employs power line communication (PLC). The structures of the signal transmission module 31, the signal modulation module 32, the signal receiving module 41 and the signal analyzing module 42 can be chip set, processor (such as CPU or MPU), integrated circuit (IC), control circuit, other accessory circuits or the combinations of related modules and components. The system framework can further be combined with operation software, firmware and software, but they should not be construed as limitations to the present disclosure.

Note that the specifications relating to the above embodiments should be construed as exemplary rather than as limitative of the present disclosure, with many variations and modifications being readily attainable by a person of average skill in the art without departing from the spirit or scope thereof as defined by the appended claims and their legal equivalents.

What is claimed is:

1. A communication power line status detecting method: comprising steps of:
    transmitting a communication indicator signal by a transmission device through a communication power line;
    obtaining the communication indicator signal by a receiving device from the communication power line;
    converting the communication indicator signal into a time domain by the receiving device; and
    analyzing a signal reflection and transmission status of the communication indicator signal transmitted via the communication power line by using a time domain transmission analyzing method by the receiving device and generating a line status information corresponding to the communication power line,
    wherein the signal changes of the communication indicator signal transmitted in the communication power line is indicated as $r(t)=s(t)*h(t)+n(t)$, wherein $s(t)$ is the signal pattern of the communication indicator signal transmitted by the transmission device, $h(t)$ is the system pulse response of the communication power line, $n(t)$ is the noise integrated with the communication indicator signal transmitted in the communication power line, $r(t)$ is the signal pattern of the communication indicator signal when it is received by the receiving device,
    wherein the signal pattern $s(t)$ transmitted by the transmission device comprises a step function signal $u(t)$, the receiving device uses the time domain transmission analyzing method to analyze the signal pattern of the communication indicator signal received by the receiving device in order to generate the line status information, the line status information can be indicated as $TDT=u(t)*h(t)$.

2. The communication power line status detecting method as claimed in claim 1, wherein the transmission device modulates the communication indicator signal and transmits the modulated communication indicator signal to the communication power line.

3. The communication power line status detecting method as claimed in claim 2, wherein the transmission device modulates the communication indicator signal by using an orthogonal frequency division multiplexing method.

4. The communication power line status detecting method as claimed in claim 1, wherein the line status information comprises the generation time of an abnormal transmitted signal generated when the communication indicator signal is transmitted in the communication power line, after the line status information is generated, further comprising a step of:
    calculating the position of the abnormal transmitted signal generated in the communication power line by the receiving device based on the generation time of the abnormal transmitted signal.

5. The communication power line status detecting method as claimed in claim 1, wherein after the line status information is generated, further comprising a step of:
    comparing the line status information with a line trend information by the receiving device in order to determine if an alarm information should be sent out or not.

6. The communication power line status detecting method as claimed in claim 5, wherein the line trend information is a standard parameter of safety communication of the communication power line.

7. The communication power line status detecting method as claimed in claim 5, wherein the line trend information is the previous line status information recorded by the receiving device when the communication indicator signal is transmitted in the communication power line.

8. A communication power line status detecting system, comprising:
    a transmission device comprising a signal transmission module for transmitting a communication indicator signal in a communication power line; and
    a receiving device comprising a signal receiving module and a signal analyzing module, the signal receiving module obtaining the communication indicator signal via the communication power line, the signal analyzing module converting the communication indicator signal into a time domain in order to analyze a signal reflection and transmission status of the communication indicator signal transmitted in the communication power line by using a time domain transmission analyzing method and to generate a line status information,
    wherein the signal changes of the communication indicator signal transmitted in the communication power line is indicated as $r(t)=s(t)*h(t)+n(t)$, wherein $s(t)$ is the signal pattern of the communication indicator signal transmitted by the transmission device, $h(t)$ is the system pulse response of the communication power line, $n(t)$ is the noise integrated with the communication indicator signal transmitted in the communication power line, $r(t)$ is the signal pattern of the communication indicator signal when it is received by the receiving device, and
    wherein the signal pattern transmitted by the transmission device comprises a step function signal $u(t)$, the signal analyzing module uses the time domain transmission analyzing method to analyze the signal pattern $r(t)$ of the communication indicator signal received by the receiving device in order to generate the line status information, the line status information can be indicated as $TDT=u(t)*h(t)$.

9. The communication power line status detecting system as claimed in claim 8, wherein the transmission device further comprises a signal modulation module for modulating the communication indicator signal and transmitting the modulated communication indicator signal to the communication power line.

10. The communication power line status detecting system as claimed in claim 9, wherein the signal modulation module modulates the communication indicator signal by using an orthogonal frequency division multiplexing method.

11. The communication power line status detecting system as claimed in claim 8, wherein the line status information comprises the generation time of an abnormal transmitted signal generated when the communication indicator signal is transmitted in the communication power line, the signal analyzing module calculates the position of the abnormal transmitted signal generated in the communication power line based on the generation time of the abnormal transmitted signal.

12. The communication power line status detecting system as claimed in claim 8, wherein the receiving device further comprises a signal comparing module, the signal comparing module is used for comparing the line status information with a line trend information in order to determine if an alarm information should be sent out or not.

13. The communication power line status detecting system as claimed in claim 12, wherein the line trend information is a standard parameter of safety communication of the communication power line.

14. The communication power line status detecting system as claimed in claim 12, wherein the line trend information is the previous line status information recorded by the receiving device when the communication indicator signal is transmitted in the communication power line.

* * * * *